Dec. 1, 1964 C. F. KODEY, JR 3,159,128
DEVICE FOR ASSEMBLING NEEDLE POINTS IN CUPS
Filed July 26, 1961 10 Sheets-Sheet 1

FIG. 1

INVENTOR
C.F. KODEY, JR.
BY
ATTORNEY

Dec. 1, 1964  C. F. KODEY, JR  3,159,128
DEVICE FOR ASSEMBLING NEEDLE POINTS IN CUPS
Filed July 26, 1961  10 Sheets-Sheet 3

INVENTOR
C. F. KODEY, JR.
BY

ATTORNEY

Dec. 1, 1964 C. F. KODEY, JR 3,159,128
DEVICE FOR ASSEMBLING NEEDLE POINTS IN CUPS
Filed July 26, 1961 10 Sheets-Sheet 5

INVENTOR
C.F. KODEY, JR.
BY
ATTORNEY

Dec. 1, 1964    C. F. KODEY, JR    3,159,128
DEVICE FOR ASSEMBLING NEEDLE POINTS IN CUPS
Filed July 26, 1961    10 Sheets-Sheet 6

INVENTOR
C. F. KODEY JR.
BY
ATTORNEY

Dec. 1, 1964   C. F. KODEY, JR   3,159,128
DEVICE FOR ASSEMBLING NEEDLE POINTS IN CUPS
Filed July 26, 1961   10 Sheets-Sheet 7

INVENTOR
C.F. KODEY, JR.
BY
ATTORNEY

Dec. 1, 1964 C. F. KODEY, JR 3,159,128
DEVICE FOR ASSEMBLING NEEDLE POINTS IN CUPS
Filed July 26, 1961 10 Sheets-Sheet 8

INVENTOR
C.F. KODEY JR.
BY
ATTORNEY

Dec. 1, 1964   C. F. KODEY, JR   3,159,128
DEVICE FOR ASSEMBLING NEEDLE POINTS IN CUPS
Filed July 26, 1961   10 Sheets-Sheet 9

INVENTOR
C.F. KODEY, JR.
BY
ATTORNEY

Dec. 1, 1964  C. F. KODEY, JR  3,159,128
DEVICE FOR ASSEMBLING NEEDLE POINTS IN CUPS
Filed July 26, 1961  10 Sheets-Sheet 10

INVENTOR
C. F. KODEY JR.
BY
ATTORNEY

United States Patent Office 3,159,128
Patented Dec. 1, 1964

3,159,128
DEVICE FOR ASSEMBLING NEEDLE POINTS
IN CUPS
Cyrill F. Kodey, Jr., South Plainfield, N.J., assignor to
Bell Telephone Laboratories, Incorporated, New York,
N.Y., a corporation of New York
Filed July 26, 1961, Ser. No. 127,004
8 Claims. (Cl. 113—129)

This invention relates to apparatus for producing a multi-point contact member in a common container, and more particularly to a device for automatically assembling and securing a plurality of pin-pointed members in a cup-like container.

Prior to the present invention, the assembling and securing of the described contact members required numerous hand operations which proved to be too tedious and time consuming for economically producing them in any sizable amounts.

It is the primary object, therefore, of this invention to provide a device and means associated therewith whereby the operations required for producing the contact members can be performed automatically.

Other objects and features of the present invention reside in the construction, arrangement and combination of parts involved in the embodiments of the invention and will be apparent or understood from the following description and accompanying drawings, wherein.

In the drawings (FIGS. 3A, 3B, 3C, 4A, 4B, 4C) corresponding steps I, II and III of both the loading and soldering mechanism indicate the sequence of operations of each that takes place simultaneously, since both of the said mechanisms are operatively interconnected.

The above-described objects are attained by the preferred embodiments shown in the drawings, with particular reference to FIGS. 1, 6, 12, 13, 14 and 15.

Figure 1:
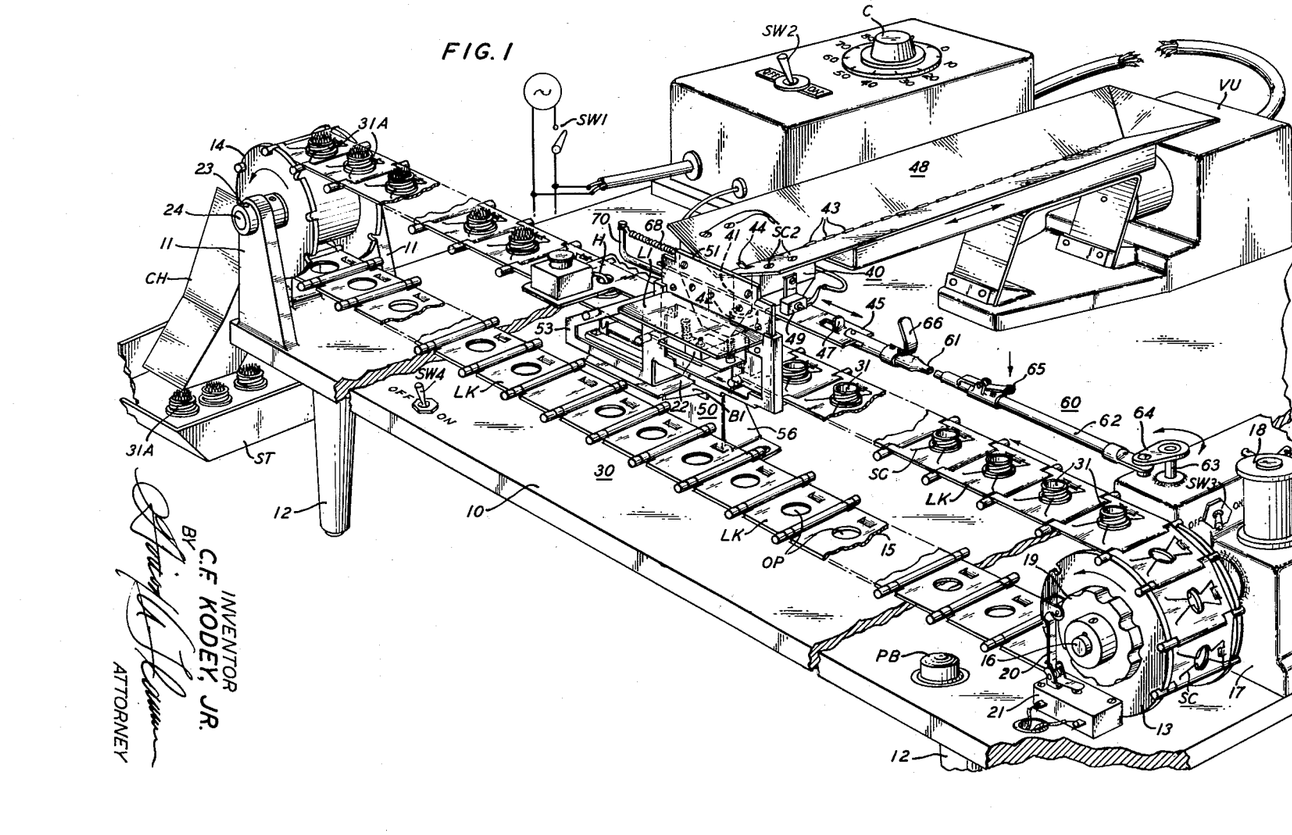
FIG. 1 is a perspective view of the device comprising this invention showing parts representative thereof arranged in cooperative relations with each other.

In the preferred embodiment shown in FIG. 1, a base 10 with integrally formed supporting members 11—11 and 12—12 is provided for mounting the various mechanisms constituting the principal device of the present invention.

Figure 3A:
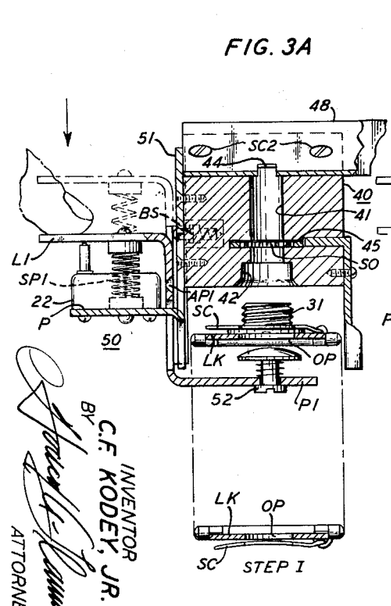
FIG. 3A is a longitudinal detail section taken along line 3A—3A of FIG. 2 showing the "initial" operation required of the loading mechanism for positioning and loading the pin container.
Figure 4A:
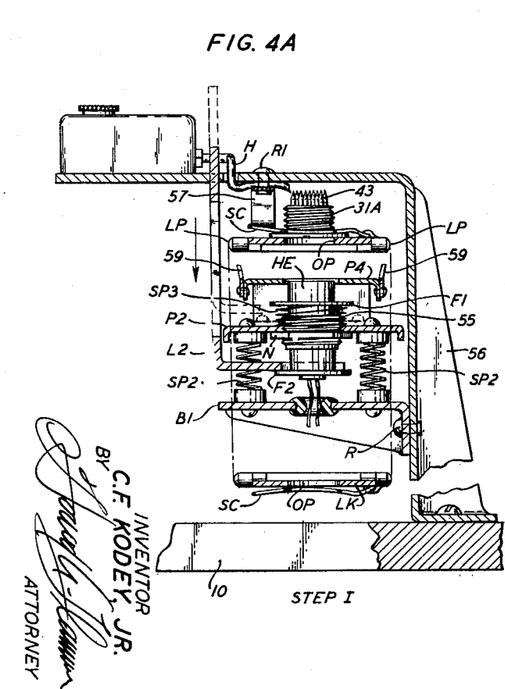
FIG. 4A is a longitudinal detail section taken along line 4A—4A of FIG. 2 showing the "initial" position of the heating element and the flux dispensing means.

One of the mounted mechanisms comprises the conveyor assembly 30 which is provided for transporting the cup containers 31 to the units 40 and 50, which respectively, perform the assembling and securing of the pin-pointed members 43 into the said containers, as shown in FIGS. 3A and 4A. This conveyor assembly comprises the linked metal belt 15 and the drive and idle sprockets 13 and 14, respectively. The drive sprocket 13 is keyed to the shaft 16 of the motor-drive unit 17 and is rotated counter-clockwise upon the energization of the solenoid 18. The idle sprocket 14 is secured by set screw 23 to the rotatable shaft 24 journaled in the arm supports 11—11.

Figure 6:
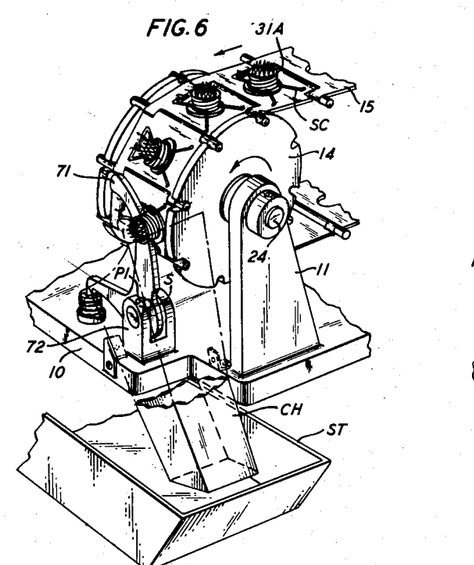
FIG. 6 is a fragmentary view in perspective showing the means whereby the loaded pin containers are automatically removed from the belt and chuted into a storage tray.
Figure 7:
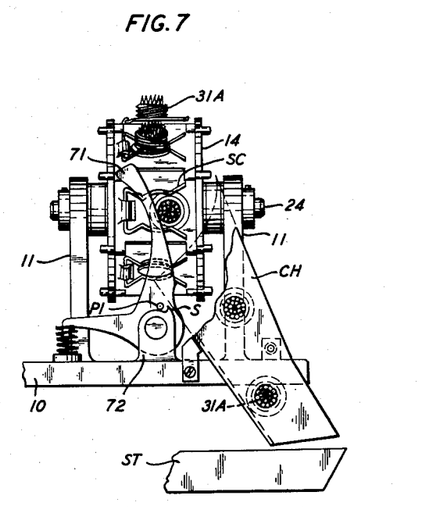
FIG. 7 is a fragmentary elevational view of the means described in FIG. 6.

On each of the links LK of belt 15 a spring clip SC, suitably formed, is secured for readily attaching and detaching the cup containers 31, as shown in FIGS. 6 and 7. Aligned with each of the spring clips SC, an opening OP is provided as a passway for the heating element HE, which is a part of the soldering mechanism included in the unit 50, shown in FIG. 1. Integral with the sprocket 13, as shown in FIG. 1, the detented wheel 19 and the engaged arm 20 of microswitch 21 are operatively combined, and with the push-button PB constitute a means which is effective for indexing the motion of the conveyor assembly 30. This motion is required for registering the attached cup containers 31 in alignment with the recess 42 and the heating element HE, both of which are located in the unit 50 in spaced relation to the cup containers 31 attached to the conveyor belt 15, shown in FIG. 2.

Figure 5A:
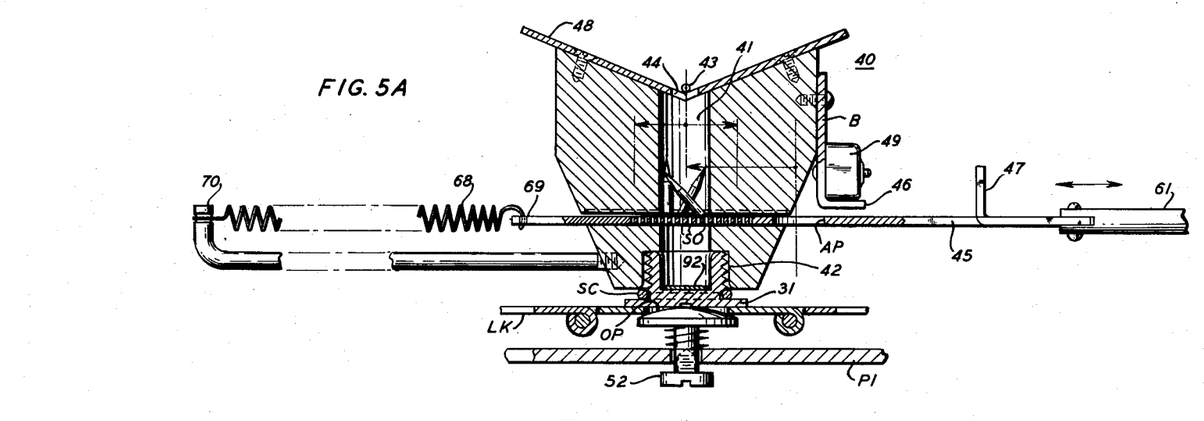
FIG. 5A is an enlarged fragmentary front section of the upper portion of the loading mechanism and the loading chute showing the reciprocally driven and slotted diaphragm upon which the pins come to rest and are positioned upright prior to their release into the pin container shown.
Figure 5B:
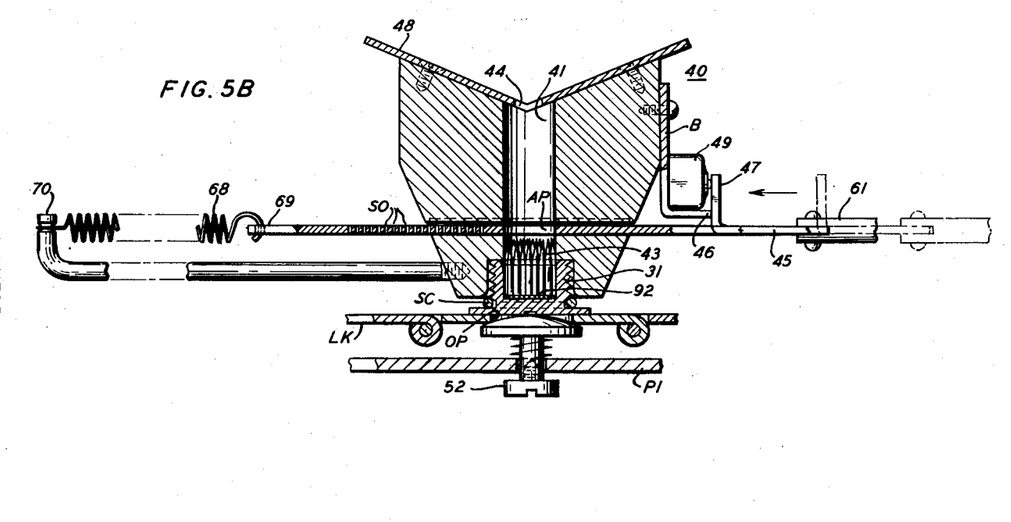
FIG. 5B is a section substantially the same as FIG. 5A except showing the diaphragm member released and in a rested position with the pins deposited within the cup container.
Figure 9:
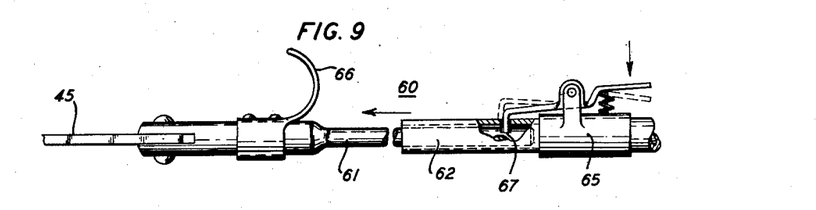
FIG. 9 is a fragmentary side view of the linkage and unlocking means provided for connecting and disconnecting the slotted diaphragm member from its reciprocal driving means shown in FIG. 1.

Housed within the motor-drive unit 17 are means suitable for oscillating the journaled shaft 63 on which crank arm 64 is keyed thereto. The crank arm 64 imparts a reciprocated motion to the diaphragm member 45 via the linkage 60, as shown in FIGS. 1, 5A and 5B for the purpose which will be described later. The right and left ends, respectively, of linkage 60 are pivotably connected to the crank arm 64 and the diaphragm member 45, and comprises the solid member 61 telescopically arranged with the tubular member 62, as shown in detail in FIG. 9. This linkage is suitably adapted for disconnection from the reciprocated motion imparted thereto by the crank arm 64 by means of the notch 67 milled within the free end of the solid link member 61 and by means of the spring catch 65 secured to the tubular member 62. For facilitating the reengagement of both link members, a finger grip 66 is secured to the solid link member 61, as shown in FIGS. 1 and 9.

The diaphragm member 45 located within the loading unit 40 is slidably arranged and bridges the chute 41 thereof for the purpose of arresting the pin members 43 deposited therein, as shown in FIGS. 3A, 5A and 5B. This diaphragm member 45 is constructed of metal having a substantially hardened surface and is provided with a plurality of diagonally slotted openings SO whose purpose is to engage the butt or blunt ends of the pin members 43 when the diaphragm member 45 is reciprocated. Thus, any of the pin members resting tilted within the chute 41 are effectively positioned upright and bunched parallel therein, as may be seen in FIG. 5A.

Figure 8:
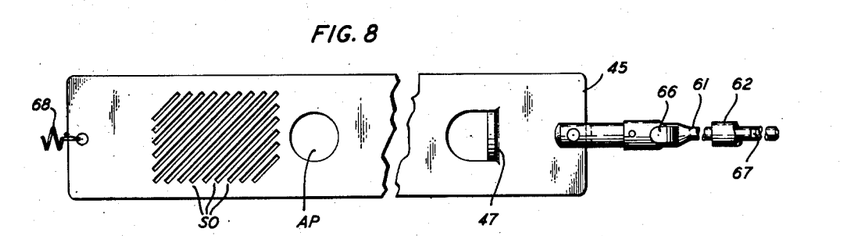
FIG. 8 is a plan view of the slotted diaphragm member.

As shown in FIG. 8 the diaphragm 45 is additionally provided with the aperture AP and an ear member 47. The aperture AP is constructed larger diametrically than the chute 41 and serves for disposing the pin members 43 into the cup container 31, ready positioned, within the recess 42 of the loading unit 40, as may be seen by referring to FIG. 5B. The disposal of the pin members 43 is effected by triggering the catch 65, whereby the diaphragm 45 is then urged toward one side by the action of biasing spring 68, which is under tension and is attached between the left end 69 of the said diaphragm and the support 70. During the movement of the diaphragm 45 to the left, as we face the apparatus, the ear member 47 thereon is brought into contact with the stop 46 on the bracket B, which is secured to the loading unit 40, as shown in FIGS. 5A and 5B. Concurrently with the alignment of aperture AP, the microswitch 49, secured to the bracket B, is operated. By the operation of this switch, the electrical vibrations produced by the vibrating unit VU are intensified and are effective for establishing the pin members 43 properly within the cup container 31, as shown in FIG. 5B.

Figures 2, 17:
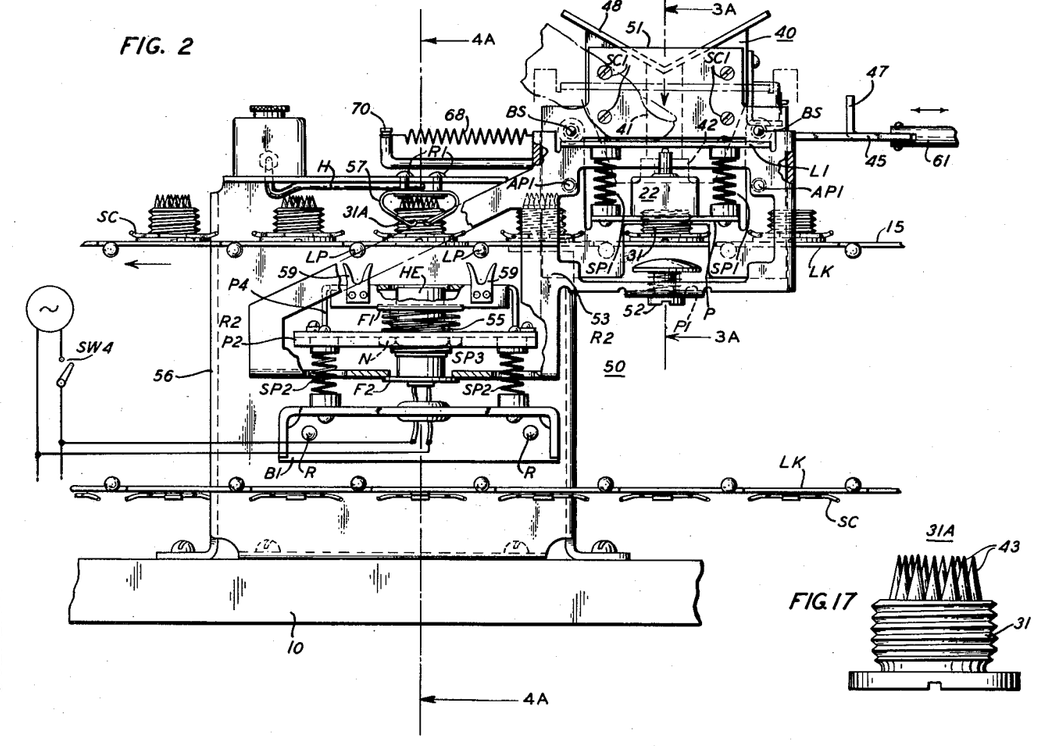
FIG. 2 is an enlarged fragmentary front elevational view of the loading and soldering mechanisms combined.
FIG. 17 is an enlarged elevational view of the completed pin assembly as produced by this device.
Figure 4B:
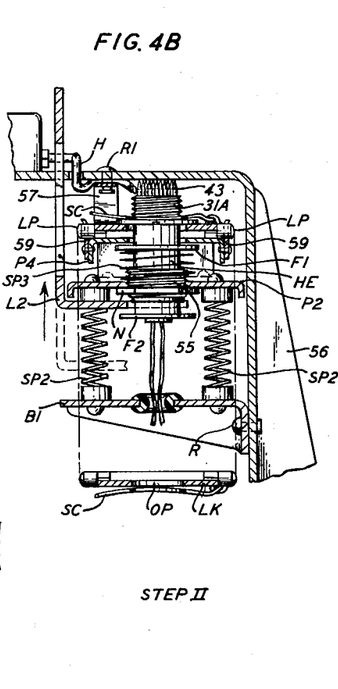
FIG. 4B is a sectional view similar to FIG. 4A except showing the soldering mechanism released and the heating element and flux being applied to the loaded pin container.

As shown in FIG. 2, the unit 50 includes the mechanisms which provide the means for inserting the empty cup container 31 into the recess 42, and also for the dispensing of the solder flux SF into the pin loaded cup container 31A, concurrent with the application thereto of the heating element HE, as respectively illustrated in the operational views FIG. 3A and FIG. 4B.

The functions of both mechanisms are performed simultaneously during the manual operation of the lever L1, as sequentially shown in FIGS. 3A, 3B, 3C and FIGS. 4A, 4B, 4C wherein they are correspondingly indicated by steps I, II and III.

Figure 3B:
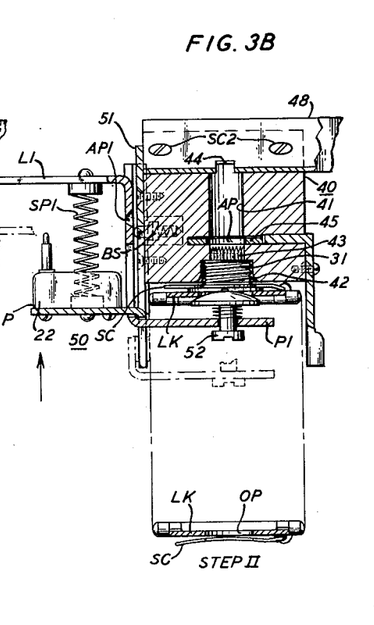
FIG. 3B is a sectional view similar to FIG. 3A except showing the pin container positioned and loaded.
Figure 3C:
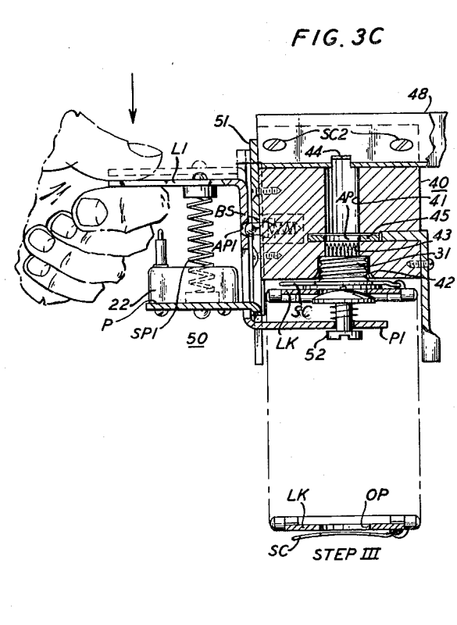
FIG. 3C is a sectional view substantially the same as FIG. 3B except showing the manual adjustment of the loading mechanism necessary for positioning the heating element of the soldering mechanism as shown in FIG. 4C.

The inserting mechanism, as shown in FIGS. 2 and 3A, includes the frame structure 53 which is slidably arranged on the plate 51 secured to the loading unit 40, by screws SC—SC. The frame structure 53 is formed so as to provide the lever L1 and the platform P. Suitably secured to the underside of lever L1 and to the top of platform P are the springs SP1—SP1, which in conjunction with means yet to be described herein, serve for urging the frame structure 53 upward when the lever L1 is manually released. Upon the release of said lever the spring loaded member 52, freely mounted on platform P1, is positioned in contact with the lower edge of the opening OP, on link LK, and also with the underside of the cup container 31A whereby the said container is inserted into the recess 42 of the loading unit 40, as shown in FIG. 3B.

The soldering mechanism, as shown in FIGS. 2 and 4A, is operatively connected with the inserting mechanism described hereinabove by means of the frame structure 53, and includes the heating element HE which is provided for soldering the pin members 43 within the cup container 31A; and also the means which is provided for dispensing the solder flux SF into the said container, as shown in FIG. 4B.

Figure 4C:
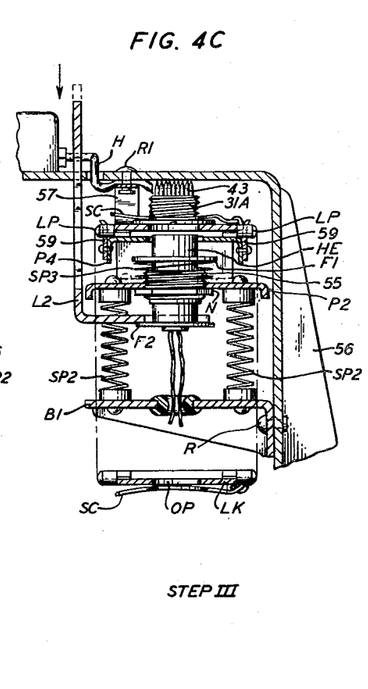
FIG. 4C is a sectional view substantially the same as FIG. 4B, but shows the heating element removed from the pin container as a result of the manual adjustment of the loading mechanism, as shown in FIG. 3C.

The heating element HE, as shown in FIG. 2, is mounted on the platform P2, and is slidable within the bushing 55 which is threaded into the said platform and secured thereto by nut N. This heating element HE and the platform P2, upon manually releasing the lever L1, are urged upward due to the combined action of their respective springs SP3 and SP2—SP2. The springs SP2—SP2 also serve conjunctively with springs SP1—SP1 of the inserting mechanism for the purpose which has been described hereinbefore. Springs SP2—SP2 are suitably secured to the underside of the platform P2 and to the bracket B1. The spring SP3 is positioned between the flange F1 on the heating element HE and the top of platform P2. Normally, the heating element HE is held in the position shown in FIG. 2 by the lever L2 which is engaged with the flange F2 secured to the bottom of the said element. The lever L2 is formed on the frame structure 53 and is operatively associated with the movement of lever L1. During the upward movement of the frame structure 53, the heating element HE is maintained aligned with the opening OP by the bifurcated members 59—59 which are suitably secured to the front and back sides of the auxiliary platform P4 for engaging the link pins LP—LP, as shown in FIGS. 4B and 4C. The auxiliary platform P4 is provided with the opening OP4 for the passage of the heating element HE, and is secured to the platform P2 by rivets R2—R2.

Concurrently with the application of the heating element HE to the cup container 31A a limited amount of solder flux SF is dispensed automatically therein by means of the arcuated spring member 57 and the flexible hose H it supports, both located adjacent to the cup container 31A, as shown in FIG. 2. The arcuated member 57 is affixed to rivets R1—R1 which are loosely mounted within the top of the supporting structure 56, so as to permit movement of the said member upon contact with the link LK of the conveyor belt 15, whereby the hose H then is compressed, resulting in the disposal of a limited amount of solder flux SF into the cup container 31A, as illustrated by FIG. 4B.

Figure 10A:
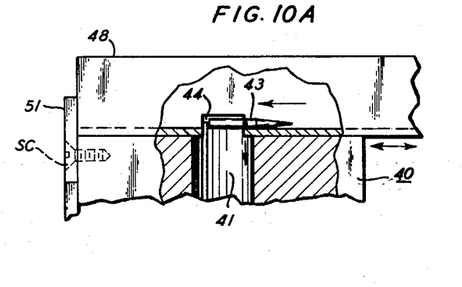
FIGS. 10A and 10B are fragmentary views of the electrically vibrated trough-shaped member shown in FIG. 1, and illustrate how pins that have been deposited blunt end first thereon, are introduced into the tubular member of the loading mechanism.
Figure 10B:
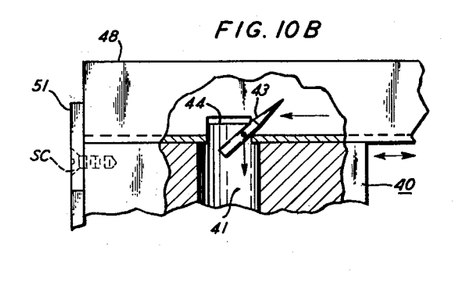
Figure 11A:
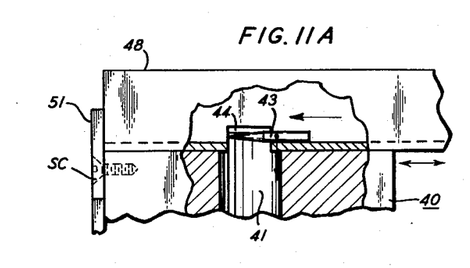
FIGS. 11A, 11B and 11C are similar views but illustrate how pins that have been deposited point first thereon, are introduced into the tubular member of the loading mechanism.
Figure 11B:
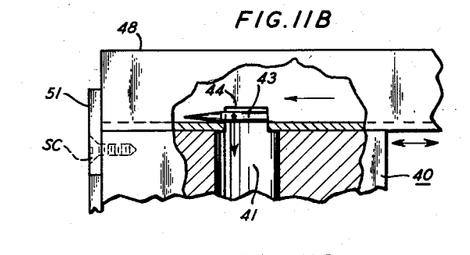
Figure 11C:
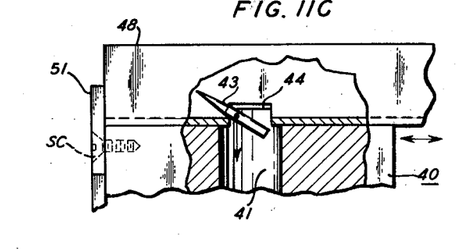

As shown in FIG. 1, the pin members 43 upon their delivery to the vibrating V-shaped trough 48 are automatically deposited into the chute 41 of the loading unit 40. The vibration of the V-shaped trough 48 is imparted thereto by the electromagnetic unit VU, commercially known as a "Syntron." The V-shaped trough 48 is affixed to the unit VU and in turn secured at its open end to the unit 40, by screws SC2—SC2. Within its open end the V-shaped trough 48 is provided with the rectangular opening 44 which is aligned with the chute 41 and serves as a passway for the pin members 43 which are delivered thereto (by reason of the vibrating action of the V-shaped trough 48). During their course of movement the pin members 43 are introduced into the chute 41, butt end first, due to the physical relationship between the rectangular opening 44 in the trough 48 and the pin member 43. The removal of mass required to point one end of the member 43 displaces the center of gravity of the member 43 away from the axial midpoint toward the blunt end. In order to insure that the member 43 falls through the opening 44 blunt end first, the dimension of the opening 44 that is parallel to the line formed by the bottom of the V-shaped trough 48 must be less than the axial distance from the center of gravity of the member 43 to its farthest or pointed end, but greater than the distance from the member's center of gravity to its nearest or blunt end. This physical relationship or cooperation between dimensions of the opening 44 with the physical properties of the members 43 causes them to fall through the opening 44 and into the chute 41 blunt end first even though the members 43 are placed at random in the trough 48. The above-mentioned cooperation is obtained as follows: If the member 43 approaches the opening or aperture 44 blunt end first, the center of gravity, being nearer the blunt end than the pointed end, will advance over the opening 44 before the blunt end bridges it. This is because the aperture dimension is greater than the distanec from the member's blunt end to its center of gravity. See FIGS. 10A and 10B. The member (or element) 43 will therefore be caused to fall through the aperture 44 blunt end first. If the element 43 approaches the opening 44 sharp end first, the sharp end will bridge the opening 44 before the center of gravity advances over it. Since the dimension of the opening 44 is smaller than the distance from the sharp end to the center of gravity of the element 43, the element 43 is forced to continue its advance along the bottom of the trough 48 until the blunt end advances over the opening 44. This once again causes the element 43 to fall through the aperture 44 blunt end first. See FIGS. 11A, 11B, and 11C. In summary, as illustrated by FIGS. 10A and 10B, the pin members 43 approaching the rectangular slot 44 butt end first will be caused to fall directly into the chute 41, whereas the pin members 43 approaching the rectangular slot 44 point first, as illustrated by FIGS 11A, 11B and 11C will be caused to span the said opening before its center of gravity passes the right edge thereof, and will continue their motion leftward until their butt ends lose support, whereupon at that instant the pin member 43 will fall blunt end first into the chute 41. The diameter of the chute 41 and the inner diameter of the cup container 31 are less than the length of the pin members 43. Therefore, the pin members cannot reverse themselves end for end once they are in the said chute.

In FIGS. 6 and 7 means are provided for automatically ejecting the assembled contact members from the conveyor belt 15 into the storage tray ST. These means comprise in addition to the chute CH, the spring loaded and arcuated lever 71 which is pivotably mounted in the bracket 72 and is maintained in position suitable for contacting the conveyed contact members by the engagement of pin P1 with the stop S, integrally formed on bracket 72.

Figure 12:
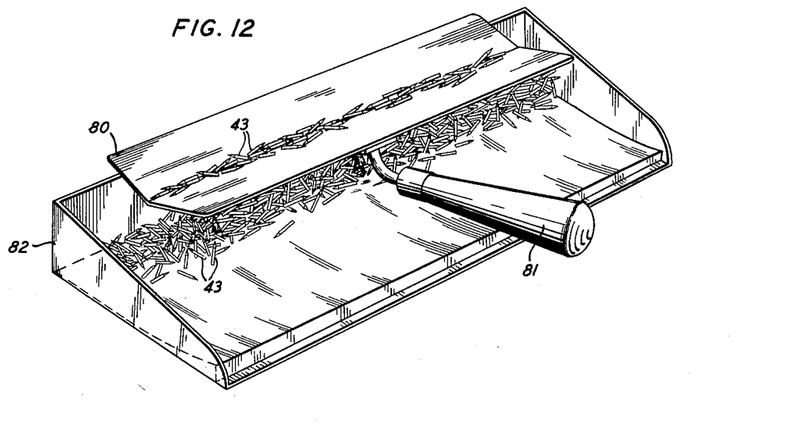
FIGS. 12 and 13 are perspective views showing the means for automatically counting the required number of pins for loading the pin container.
Figure 13:
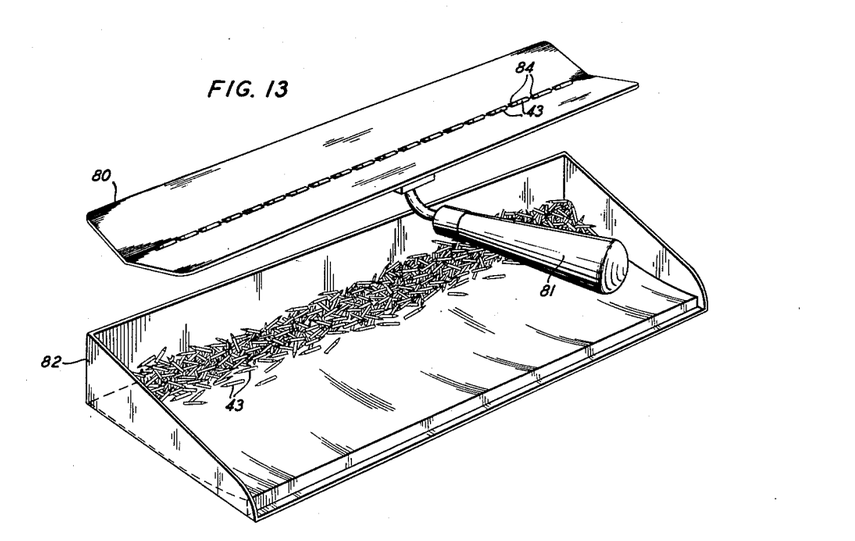

In FIGS. 12 and 13, means are shown for automatically separating (from a bulk supply) the exact amount of pin members required for filling one of the cup containers 31, and for manually conveying said members to the vibrated trough 48, shown in FIG. 1. These means include the storage tray 82 and the V-formed scoop 80 which is adapted for hand operation by means of handle 81. This scoop 80 is provided with a plurality of indentations 84 aligned along the V-formed portion thereof, which in number is equal to the amount of pin members 43 required for filling one cup container 31. These indentations 84 serve for receiving the pin members 43 and are each suitably dimensioned for accepting only one thereof.

The automatic separation of the pin members is accomplished as follows: a batch of pin members 43, in excess of the required amount, is first obtained from the bulk supply contained in storage tray 82 by using the scoop 80 which next is gently agitated by hand, thereby causing one pin member 43 to fall into each indentation 84, and the excess remaining to fall from the ends of said scoop into the tray 82.

Figure 14:
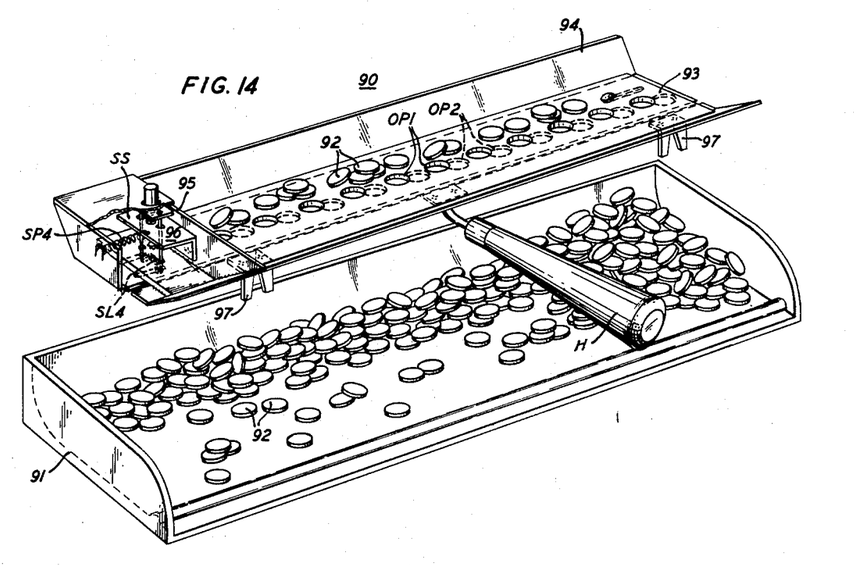
FIGS. 14 and 15 are perspective views showing the means for automatically depositing preformed solder slugs into a plurality of pin containers mounted on the conveyor belt of the device.
Figure 15:
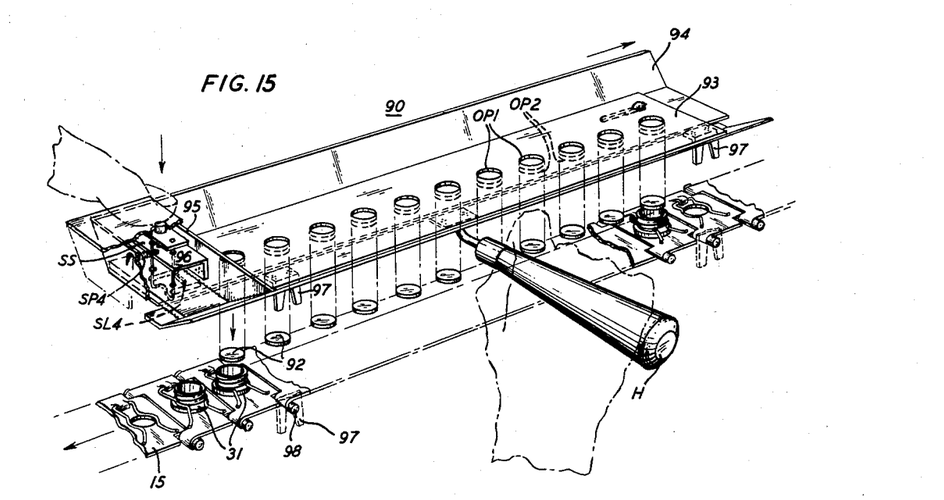

In FIGS. 14 and 15, means are provided for automatically dispensing preformed discs of solder into a plurality of cup containers while attached to the belt 15 of the conveyor assembly 30, shown in FIG. 1. The means described include the trough 90 and storage tray 91.

As shown in the drawings, the trough 90 is constructed having a fixed section 93 to which bifurcated members 97 and the handle H are secured thereto, and also having a slidable section 94. Respectively, provided on sections 93 and 94 are openings OP1 and OP2 which are spaced thereon with respect to the cup containers 31 on belt 15, and serve as means for receiving and disposing the preformed discs of solder 92, as illustrated by FIGS. 14 and 15. The slidable section 94 is arranged to be urged rightward by the action of the spring SP4 which is secured immediate the left end of said section and the supporting structure SS, but is normally maintained in the position as shown in FIG. 14 by means of the spring loaded catch 96, thus, permitting use of the trough 90 as a scoop to obtain the preformed discs of solder 92 from the storage tray 91. The spring loaded catch 96 is suitably adapted for engaging the slot SL4 within the slidable section 94, and is assembled on the supporting structure SS which is secured to the partition 95 which in turn is secured solely to the fixed section 93 so as to permit free movement of the slidable section 94.

Subsequent to obtaining a quantity of the preformed discs of solder 92 from the tray 91 in excess to the number of openings OP1 by using the trough 90 as a scoop, the said discs are automatically dispensed in the following manner; the trough 90 is suitably agitated by hand so as to cause one preformed disc to fall into each of the openings OP1 wherein they are retained due to the alternate spacing of openings OP1 and OP2. Upon placing the trough 90 on belt 15 with the bifurcated members 97 engaging the link pins 98, and by subsequently releasing the spring loaded catch 96, the preformed discs of solder 92 that have been retained within the openings OP1 are effectively released into a plurality of the cup containers 31, as shown in FIG. 15.

*Operation*

Figure 16:
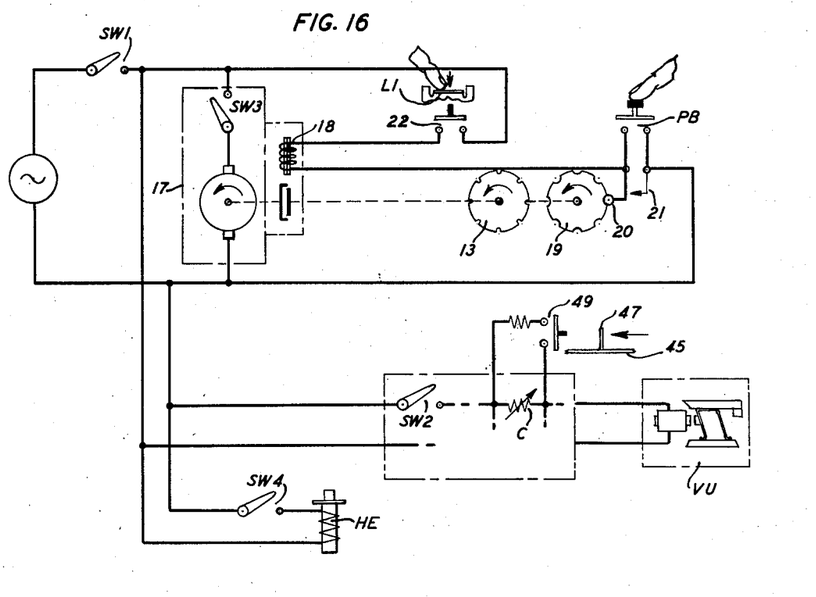
FIG. 16 is a schematic wiring diagram disclosing the circuit arrangement for the device of this invention.
Figure 18:
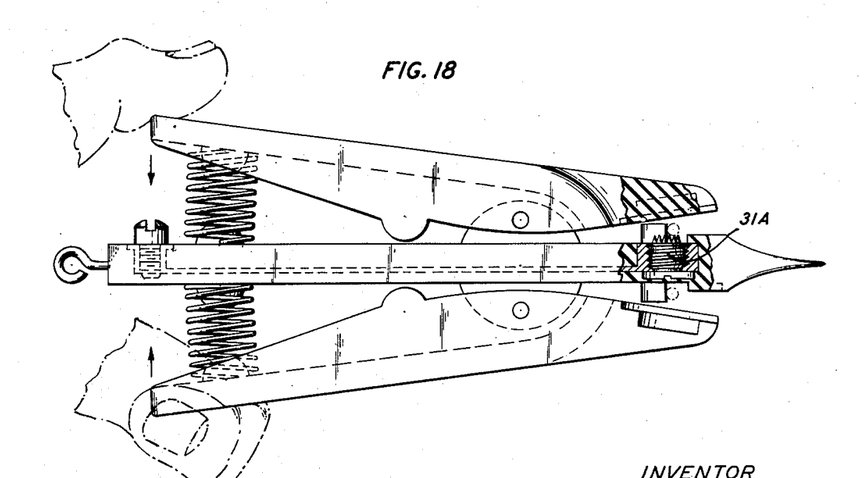
FIG. 18 is a side elevation of a cable clip partially shown in section to illustrate the use of the pin assembly produced by this device.

Subsequent to attaching a plurality of cup containers to the conveyor belt and depositing the required amount of pin members into the vibrated trough for filling one of such containers and closing switches SW1, SW2, SW3 and SW4, the lever L1 is then positioned, as shown in FIGS. 2 and 3A. The lever L1 so positioned permits free movement of the conveyor belt 15 and in turn operates the microswitch 22 whereby the electrical circuit provided for controlling the device, as shown in FIG. 16, is conditioned so that, upon operating the pushbutton PB intermittently, stepped motion is effectively applied to the conveyor belt 15 for the purpose of aligning the cup containers 31 with the recess 42 and also for aligning the pin loaded containers 31A with the heating element HE, as shown in FIGS. 2, 3A and 4A. Upon aligning said containers the lever L1 is next positioned, as shown in FIG. 3B whereby simultaneously the cup container 31 is inserted into the recess 42 and the heating element HE is applied to the bottom of the pin loaded container 31A, as respectively shown by FIGS. 3B and 4B. While the lever L1 is maintained in the position just described, the spring catch 65 is triggered thereby disconnecting the linkage 60. Upon the disconnection of linkage 60 the reciprocated motion imparted to the diaphragm member 45 is halted and the ear member 47 thereon is positioned against the stop 46 due to the movement of the diaphragm member leftward, effected so by the action of spring 68, as shown in FIG. 5B. Resulting also from the triggering of catch 65, the aperture AP on diaphragm 45 is effectively aligned with the chute 41 thereby disposing the pin members 43 into the cup container 31, and operating also microswitch 49, as shown in FIG. 5B. By the operation of microswitch 49, intensified vibrations are imparted to the trough 48, for the purpose which was described heretofore.

During the placement of the pin members 43, a suitable amount of solder flux is automatically dispensed into the pin loaded container 31A, simultaneously as the heating element is applied to the bottom thereof, as respectively shown in FIGS. 3B and 4B. Subsequent to positioning lever L1, as shown in FIG. 3B, a short heating interval is provided for suitably melting the preformed solder (ready contained) within the cup container 31A. After this interval has elapsed, the lever L1 is then operated downward to the position determined by the engagement of the ball stop BS with aperture AP1 whereby the heating element HE is then removed from the completely assembled contact member 31A, as shown in FIG. 4C.

Upon completing the series of operations as described above, lever L1 is then restored to its initial position shown in FIGS. 2 and 3A. During repeated operations of the device the completed multi-pointed contact members are automatically ejected from the conveyor belt 15 into the storage tray ST by means shown in FIGS. 6 and 7.

While there has been shown in the accompanying drawings, and described herein, a preferred embodiment of my invention, it will be understood that various changes may be made therein without departing from the scope and spirit of the invention.

What is claimed is:

1. A device for the placement and securing of a plurality of needle-shaped elements in cup-like containers, the centers of gravity of said elements being displaced from the geometric center toward the blunt ends of said elements because of said needle shape, in combination: a trough-shaped member adapted to hold a plurality of said elements, said trough having an aperture aligned and communicating with the upper end of a vertically extending bore of a support, the dimension of said aperture in the direction of said elements being smaller than the distance from said element's center of gravity to its farthest end but greater than the distance from said element's center of gravity to its nearest end, means in juxtaposition with respect to the lower end of said bore for supporting said containers, a slideably mounted apertured plate having a plurality of slots therein positioned across said bore between said trough and said means, and means for oscillating said plate in a position wherein said slots are in said bore, the width dimensions of said slots being smaller than the diameters of said elements and adapted to catch the blunt ends of said elements to align and stand them upright in said bore but not to allow them to drop therethrough, means for imparting vibration to said trough to advance said elements toward said trough aperture, the latter adapted dimensionally to cooperate with said elements, so that if said elements approach said aperture blunt end first, the center of gravity of said element will advance over said aperture before said blunt end bridges said aperture thereby causing said element to fall through said aperture and into said bore blunt end down, and if said elements approach said aperture sharp end first, the latter will bridge said aperture before said element's center of gravity advances over said aperture forcing said element to continue to advance until said center of gravity and blunt end advance over said aperture thereby causing said element to fall through said aperture and into said bore blunt end down, said plate located to intercept said elements in said bore above said containers and adapted to orient them in an upright aligned position, and means for moving said plate laterally to align said plate aperture with said bore and drop said elements into said containers sharp ends up.

2. A device according to claim 1 wherein the diameter of said bore is smaller than said element's length thereby preventing said elements from turning over in said bore.

3. A device according to claim 2 wherein said first-mentioned means further comprises sprocket wheel members spaced apart and journalled on suitable axle members on each side of said support, said sprocket members having mounted thereon an endless belt for supporting said containers in juxtaposition with respect to the lower end of said bore.

4. A device according to claim 3 wherein indexing means are associated with one of said sprockets to automatically align said containers with the vertically extending bore of said support.

5. The device described in claim 4 wherein said slots are oblique to said plate and parallel to each other.

6. A device for the placement and securing of a plurality of needle-shaped elements in cup-like containers having a heat softenable adhesive on the bottoms thereof, the centers of gravity of said elements being displaced from the geometric center toward the blunt ends of said elements because of said needle shape, in combination: a trough-shaped member adapted to hold a plurality of said elements, said trough having an aperture aligned and communicating with the upper end of a vertically extending bore of a support, the dimension of said aperture in the direction of said elements being smaller than the distance from said element's center of gravity to its farthest end but greater than the distance from said element's center of gravity to its nearest end, sprocket wheel members spaced apart and journaled on suitable axle members on each side of said support, said sprocket members having mounted thereon an endless belt for supporting said containers in juxtaposition with respect to the lower end of said bore, said belt having openings therein arranged to register with said containers, a slideably mounted apertured plate having a plurality of slots therein positioned across said bore between said trough and said lower end of said bore, means for oscillating said plate in a position wherein said slots are in said bore, the width dimensions of said slots being smaller than the diameters of said elements and adapted to catch the blunt ends of said elements to align and stand them upright in said bore but not to allow them to drop therethrough, means for imparting vibration to said trough to advance said elements toward said trough aperture, the latter adapted dimensionally to cooperate with said elements so that if said elements approach said aperture blunt end first the center of gravity of said element will advance over the aperture before said blunt end bridges said aperture thereby causing said element to fall through said aperture and into said bore blunt end first, and if said elements approach said aperture sharp end first, the latter will bridge said aperture before said element's center of gravity advances over said aperture thereby forcing said element to continue to advance until said center of gravity and blunt end advance over said aperture causing said element to fall through said aperture and into said bore blunt end first, said plate located to intercept said elements in said bore above said containers and adapted to orient them in an upright aligned position, and means for moving said plate laterally to align said plate aperture with said bore and drop said elements into said containers sharp end up.

7. The device described in claim 6 wherein indexing means are associated with one of said sprockets to automatically align said containers with the vertically extending bore of said support.

8. The device described in claim 7 wherein it further includes means for introducing into said cups and into contact with said adhesive means a fluxing material and means for selectively applying heat to said cup members through said belt openings to soften said adhesive means.

References Cited in the file of this patent

UNITED STATES PATENTS

| | | |
|---|---|---|
| 2,446,079 | Curry | July 27, 1948 |
| 2,672,837 | Maher | Mar. 23, 1954 |
| 2,720,855 | Brent et al. | Oct. 18, 1955 |
| 2,748,450 | Flaws et al. | June 5, 1956 |
| 2,748,738 | McGowan et al. | June 5, 1956 |